Dec. 31, 1935.   R. BERNHARDT   2,025,846
PUMP
Filed Dec. 3, 1932
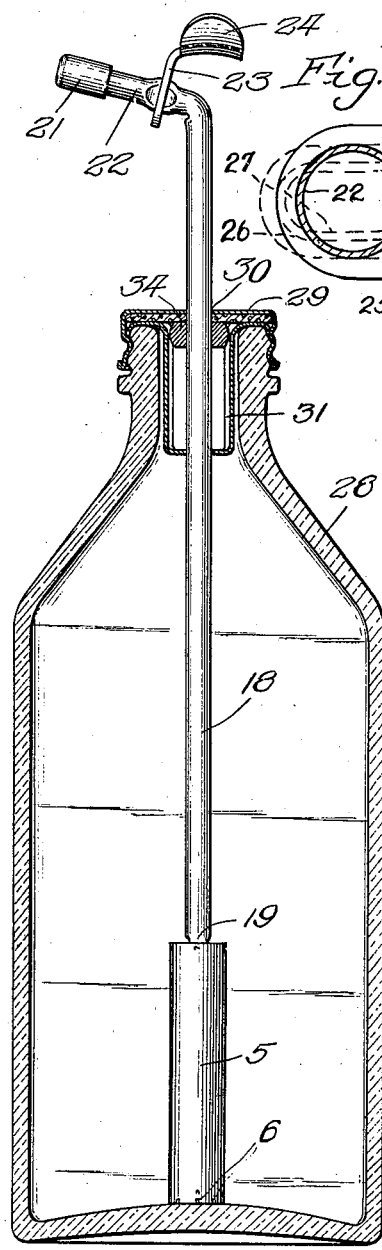
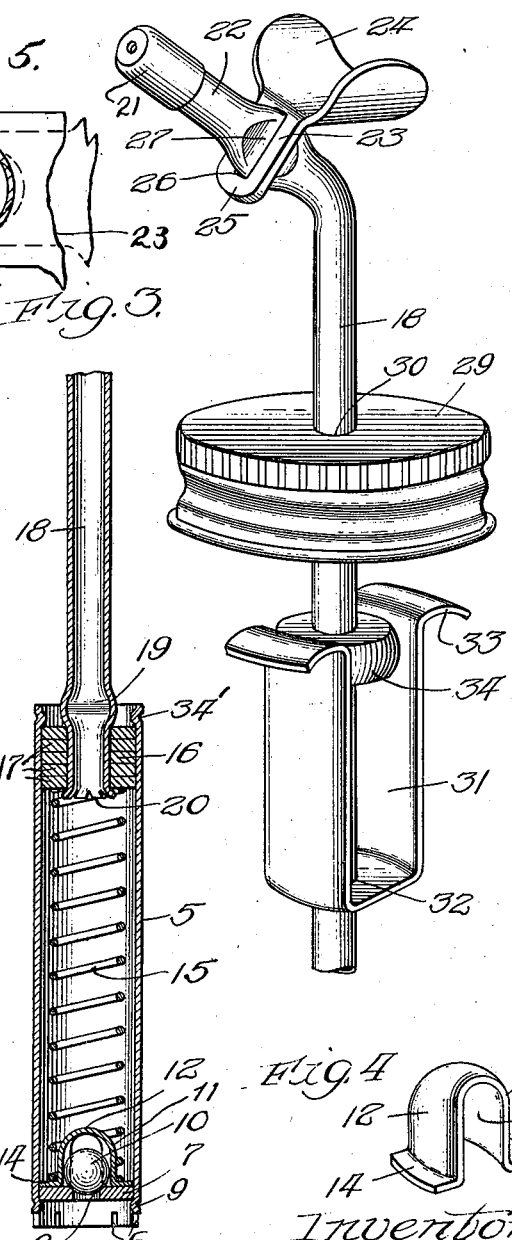
Inventor:
Rudolph Bernhardt,
By Glenn S. Noble Atty.

Patented Dec. 31, 1935

2,025,846

UNITED STATES PATENT OFFICE 2,025,846

PUMP

Rudolph Bernhardt, Chicago, Ill.

Application December 3, 1932, Serial No. 645,554

8 Claims. (Cl. 299—97)

This invention relates to pumps particularly adapted for use as atomizers for spraying liquids of various kinds. One of the uses for which these pumps are particularly adapted is in connection with bottles or relatively small receptacles, the arrangement being such that the receptacle may be supported and the pump operated with one hand. Such atomizers are used for instance in spraying cleaning fluid on windshields or windows, the other hand being left free for wiping the same.

One of the particular objects of this invention is to provide a pump or atomizer of exceedingly simple construction and which may be made very cheaply while at the same time serving efficiently for the purposes intended. Other objects of the invention are to provide a pump or atomizer having a reciprocating tube or stem with a finger piece attached thereto in a novel manner; to provide an improved piston and means of attaching the same to a piston rod; to provide a cylinder having a check valve and valve retainer with a spring serving to hold the retainer in position and also to actuate the piston; to provide an improved ball valve retainer; to provide a guide or bearing adapted to be associated with a bottle cap; to provide a packing or packing washer which coacts with the guide; and to provide such other novel features and advantages as will appear hereinafter.

In the accompanying drawing illustrating this invention;

Figure 1 is a sectional side view of a bottle or container with the pump mounted therein;

Figure 2 is an enlarged perspective view of the discharge pipe or hollow piston rod with parts associated therewith shown in separated or disassembled position;

Figure 3 is an enlarged longitudinal sectional view of the cylinder and coacting parts;

Figure 4 is a perspective view of the ball valve retainer; and, Figure 5 is a sectional detail showing the hollow piston rod and thumb piece in full lines, before they are secured together and in dotted lines after they have been secured together.

The cylinder 5 is preferably made of relatively light tubing, Figure 1 showing a full sized embodiment of one form of the invention. The lower end of the cylinder is provided with notches 6 to permit the entrance of the fluid when the cylinder is resting on the bottom of the container. The lower end of the cylinder is closed by a washer 7 having an inlet opening 8. This washer is preferably punched out of sheet stock and is held in position by indenting the sides of the cylinder as shown at 9. The washer furnishes a valve seat for a ball valve 10 which is adapted to close the inlet opening 8 at times and serve as a check valve. The valve 10 is guided in its movement and held in juxtaposition with the washer by means of a valve cage or retainer 11. This retainer is also preferably formed of light sheet metal and has a central U-shaped portion 12 with openings 13 in the sides. The lower ends of the U-shaped portion are provided with flanges 14 which engage with the washer 7.

The valve retainer 11 is held downwardly or pressed against the washer 7 by means of a spring 15, which spring also serves for raising the piston 16 and parts connected therewith. The piston 16 is formed of a plurality of washers 17 which are preferably formed of brass or other suitable metal and which may be readily punched from sheet stock. These washers are assembled on the lower end of a hollow piston rod or discharge pipe 18, as shown particularly in Figure 3, and are held in position by having the pipe slightly flattened or deformed as shown at 19 above the washers, and staked or riveted as shown at 20 below the washers. These operations may be performed simultaneously so that the completed piston may be rapidly and cheaply constructed. The upper end of the discharge pipe 18 has any suitable form of nozzle or atomizer 21. The piston is held in the cylinder or stopped by indentations 34 in the sides of the cylinder. The upper portion 22 of the pipe 18 is preferably bent at an angle to the main portion and is provided with a finger piece 23 for operating the pump. This piece comprises a saddle-like portion 24 for the finger which has a branch 25 with a hole 26 for receiving the end portion 22. The hole in the blank is made round to fit over the pipe and the sides are then flattened to compress and distort the pipe as shown at 27 and to firmly secure the finger piece thereto.

In the adaptation shown, the pump is mounted in a bottle 28 having a cap 29 which preferably screws thereon. The cap is provided with a hole 30 for the tube 18. In order to hold the pump upright or centrally in the bottle, I provide a U-shaped guide or bearing 31 which has a hole 32 in the lower end for the passage of the tube and which is provided with flanges 33 which are preferably curved or hook shaped in order to engage closely with the upper end of the bottle and to be firmly held in position by the cap 29.

While in some instances the cap may fit around the pipe sufficiently tight to prevent leakage, I provide a resilient gasket or washer 34 which fits closely on the tube 18 and is adapted to be pressed against the lower surface of the cap when the tube is in raised position, thus making a tight closure or joint between the tube and the cap.

When the pump is to be used, the operator holds the bottle in the hand preferably with the cap or neck portion between the thumb and second finger and with the first finger resting on the finger piece 24. He then presses the discharge tube down which causes the liquid in the cylinder 5 to be forced upwardly and out through the discharge nozzle. Inasmuch as the piston is readily operated, it is not essential that there be a perfect fit between the piston and the cylinder as considerable leakage may be permitted without objection as the liquid is retained in the bottle. At the completion of the discharge stroke, the finger is raised and the spring forces the piston and parts connected therewith back to normal or raised position and at the same time a fresh supply of liquid is drawn into the cylinder past the check valve for the next operation. It will be noted that the stroke of the piston is preferably greater than the length of the bearing or bracket 31 so that when the pipe moves downwardly, the gasket or packing ring 34 will still be in position to engage with the cap on the upward stroke of the piston.

While I have shown and described a form of my invention particularly intended for atomizing or spraying, it will be observed that the construction may be modified for other purposes or used without departing from various essential features of the invention, and therefore I do not wish to be limited to such structural features except as specified in the following claims, in which I claim:

1. In an apparatus of the character set forth, the combination of a receptacle having a cap, a pump cylinder engaging with the bottom of the receptacle, a piston adapted to coact with the cylinder, a spring for raising the piston, a discharge tube connected with the piston and extending outwardly through the cap, a finger piece secured to the tube for pressing the same downwardly and a U-shaped bracket having a bearing at the lower portion thereof for the tube and also having projections extending over the top of the bottle and adapted to be engaged by the cap.

2. The combination with a bottle or the like having a cap, of a spray pump having a combined piston operating and discharge tube extending through the cap and a U-shape bracket having a bearing at the lower portion thereof for the tube, and also having projections extending over the top of the bottle and adapted to be engaged by the cap.

3. The combination with a bottle having a cap, of a sprayer having a cylinder resting on the bottom of the bottle, a piston in said cylinder, a spring tending to raise the piston, a hollow piston rod extending from the piston outwardly through a hole in the cap, means on the rod for engagement with the finger for pressing the rod inwardly, a guide member interposed between the cap and the bottle and having a bearing for the rod at some distance below the cap, a packing ring slidably mounted on the rod for engagement with the inner surface of the cap, said bearing also serving to limit the downward movement of said ring when the rod is pressed to operate the pump.

4. The combination with a hollow piston rod, of a thumb piece for operating the same, comprising a saddle shaped portion with a projection having a hole through which the rod passes, said projection having a distortion projecting into a similar distortion in the rod to hold the rod and thumb-piece together.

5. The combination with a reciprocable discharge tube, of a thumb piece having a hole therethrough for receiving the tube, a portion of the thumb-piece having a distortion projecting into a distortion in the tube to hold the thumb-piece in fixed position on the tube.

6. The method of attaching an operating member to a tube which consists in forming a hole in the member for receiving the tube, then inserting the tube in the hole and finally compressing the sides of the member to distort the same and to distort the adjacent portions of the tube whereby the member will be held in fixed position on the tube.

7. The combination with a bottle having a cap, of a pump having a reciprocable combined piston operating and discharge tube projecting through a hole in the cap and freely movable therethrough, and a packing member slidably mounted on the tube and movable therewith when the tube is reciprocated and which engages with the lower face of the cap when the tube is in outwardly projected position, and means coacting with the tube for limiting the movement of the packing member with respect to the tube when the tube is pressed inwardly, said limiting means surrounding the tube at a greater distance below the cap than the length of the packing, whereby the packing will be held in proper position on the tube to engage with the cap when the tube moves to outwardly projected position.

8. The combination with a bottle having a screw top, of a pump having a discharge tube extending through a hole in the top, means for reciprocating the tube, a packing member frictionally engaging with the tube below the top and adapted to move therewith when the tube is reciprocated, and means for limiting the inward movement of the packing member when the tube is pressed inwardly, said means being positioned at a greater distance below the cap than the length of the packing member, the space between the packing member and the limiting means when the tube is in normally projected position being less than the full inward stroke of the tube whereby the packing member will always be in position to engage with the top when the tube is in normally projected position.

RUDOLPH BERNHARDT.